United States Patent
McGlennen et al.

(10) Patent No.: US 7,791,831 B2
(45) Date of Patent: Sep. 7, 2010

(54) DATA STORAGE DISC TRACK CENTERING

(75) Inventors: James H. McGlennen, Eden Prairie, MN (US); Ronald E. Anderson, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1213 days.

(21) Appl. No.: 11/249,581

(22) Filed: Oct. 13, 2005

(65) Prior Publication Data

US 2007/0086295 A1    Apr. 19, 2007

(51) Int. Cl.
  *G11B 21/04* (2006.01)
(52) U.S. Cl. .................................................. 360/70
(58) Field of Classification Search .................... 360/75, 360/77.08, 77.02, 78.04, 69, 70; 720/721, 720/704, 706, 702; 369/44.28, 44.32; 428/64.4
  See application file for complete search history.

(56) References Cited

U.S. PATENT DOCUMENTS

| | | | |
|---|---|---|---|
| 5,825,746 A | | 10/1998 | Lee |
| 5,901,121 A | * | 5/1999 | Yamashita et al. ....... 369/44.28 |
| 6,118,739 A | * | 9/2000 | Kishinami et al. ....... 369/44.28 |
| 6,128,153 A | * | 10/2000 | Hasegawa et al. ......... 360/77.08 |
| 6,370,094 B1 | * | 4/2002 | Kishinami et al. ....... 369/44.32 |
| 6,496,322 B1 | * | 12/2002 | Hasegawa et al. ........ 360/77.08 |
| 6,741,544 B1 | * | 5/2004 | Masaki et al. ................ 720/702 |
| 6,768,705 B2 | | 7/2004 | Hirai |
| 6,771,451 B2 | | 8/2004 | Morris et al. |
| 6,817,026 B2 | * | 11/2004 | Berg et al. ................... 720/721 |
| 6,829,777 B2 | | 12/2004 | Tokumitsu |
| 7,009,802 B1 | * | 3/2006 | Ehrlich .......................... 360/75 |
| 7,051,346 B2 | * | 5/2006 | Masaki et al. ................ 720/706 |
| 7,363,641 B2 | * | 4/2008 | Torii ............................. 720/704 |
| 2003/0016599 A1 | * | 1/2003 | Watanabe ................. 369/44.32 |
| 2003/0157292 A1 | * | 8/2003 | Medower et al. ........... 428/64.4 |

* cited by examiner

*Primary Examiner*—Fred Tzeng
(74) *Attorney, Agent, or Firm*—Shumaker & Sieffert, P.A.

(57) ABSTRACT

The invention is directed to methods and apparatus for repositioning a data storage disc on a spindle assembly, to reduce eccentricity of data on the disc. The eccentricity can be identified and be reduced automatically by determining the magnitude and direction of an eccentricity vector that representing a misalignment of a central point around which the data are arranged on a data storage disk with an axis of a spindle, and moving the disc so that the eccentricity vector is reduced. One technique for moving the disc is to push the edge of the disc so that the central point moves closer to the axis of the spindle.

26 Claims, 4 Drawing Sheets

DATA STORAGE DISC TRACK CENTERING

TECHNICAL FIELD

The invention relates to drives that rotate data storage discs.

BACKGROUND

Data storage devices that read data from and write data to data storage discs include an apparatus that writes the data on the disc, reads the data from the disc, or performs both functions. Because of the high density of data stored on a data storage disc such as an optical or electromagnetic disc, the reading or writing element should be carefully constructed and should be tested to ascertain whether it performs up to standards of quality.

Prior to attaching a head gimbal assembly (HGA) into a hard disc drive, for example, it is desirable to dynamically test the functionality of the read and write transducers that reside on the HGA so that a defective HGA may be identified and sorted. Such testing can include preliminary activities to align, configure, and prepare the HGA for testing, followed by the actual electrical test of the HGA. Because an HGA is typically small, fragile, and contains sensitive electronic components, it is susceptible to mechanical stress, electrostatic discharge, environmental contamination, and other handling-related issues. To avoid these handling-related issues, current systems mount the HGA on an intermediate mounting fixture that supports the HGA throughout the testing process.

Testing of the HGA typically includes reading from and writing to a test disc. The test disc can include servo tracks or servo patterns. Servo tracks and servo patterns are position information located at pre-selected sites on the disc. This position information can be used by an HGA controller to identify the location of the HGA's transducer with respect to the disc, to control HGA motion and to regulate HGA position so that reading or writing can be performed in the proper place. The test disc may further include data other than position information.

Data on a data storage disc is typically arranged concentrically or spirally around a central point. The location of the central point depends upon the data or the tracks on the disc, which is not necessarily coincident with the geometric center of the disc. When the disc is mounted upon a spindle for rotation, the disc is rotated about an axis of the spindle. As a practical matter, data written on the disc is eccentric with respect to the disc, and therefore, the data will also be eccentric with respect to the spindle axis. The motion control system holding the HGA reading data from or writing data to such a disc may have to compensate for the eccentricity. During testing of HGAs, it may be desirable to reduce the eccentricity so that eccentricity does not interfere with the testing, so that compensation for eccentricity is of no important consequence.

SUMMARY

In general, the invention is directed to techniques for centering disc tracks for reading and writing. The invention will be described in the context of an automated head gimbal assembly (HGA) testing apparatus, which calibrates itself before testing an HGA. One way in which the testing apparatus may calibrate itself is by reducing the eccentricity of data on a test disc used for testing HGAs, so that the eccentricity does not interfere with the testing.

The invention supports automatic identification and reduction of the eccentricity. The eccentricity can be identified by any of a number of techniques, such as by observing servo marks or servo patterns on the disc. The invention provides for reducing eccentricity by moving the central point, which is the point around which the data are arranged, closer to the axis of the spindle. One technique for doing so is to push the edge of the disc so that the central point moves closer to the axis of the spindle.

An automated positioner assembly mounted with a pusher can control the position of the pusher to a high degree of accuracy. By pushing the edge of the disc at a point on the edge where there is maximum deviation of a track from its ideal position, the central point can be driven toward the axis. When the pusher pushes the edge by the magnitude of the eccentricity vector, the eccentricity vector will be driven to zero. One or more processors can automatically determine the magnitude and direction of the eccentricity vector and orient the disc and pusher so that pushing the disc will drive the central point toward the axis of the spindle.

In order to push the edge by the magnitude of the eccentricity vector, however, the processor first determines where the edge of the disc is located. One way to determine the location of the edge of the disc is to secure the disc to the spindle with an apparatus such as a vacuum clamp, then move the pusher toward the disc. At some point, the pusher encounters the edge of the disc, and because the disc is secured to the spindle, the pusher encounters resistance. Resistance can be determined using force, velocity, or position sensing devices that measure the pusher relative to the commanded acceleration, velocity, or position respectively. The point at which the pusher encounters resistance is where the edge is determined to be. The disc can then be released from the spindle, thereby allowing the disc to be repositioned with respect to the spindle. The pusher then moves to the edge and pushes the edge by the magnitude of the eccentricity vector.

In one embodiment, the invention is directed to a method that comprises determining a magnitude and a direction of an eccentricity vector. The eccentricity vector represents the misalignment of a central point around which data are arranged on the disk and the axis of a spindle. The method further comprises determining the location of an edge of the disc, and pushing the edge of the disc with a processor-controlled positioner to drive the central point closer to the axis of the spindle.

In another embodiment, the invention is directed to a computer-readable medium containing instructions. The instructions cause a programmable processor to carry out the methods of the invention.

In a further embodiment, the invention is directed to a system comprising a spindle assembly, a positioner assembly means and a processor means. The spindle assembly comprises a spindle adapter configured to secure a data storage disc to the spindle assembly. The positioner assembly means is configured to move the disc with respect to the spindle assembly. The processor means is configured to determine a magnitude and a direction of an eccentricity vector and to control the positioner assembly means to drive a central point around which data are arranged on the disc closer to the axis.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
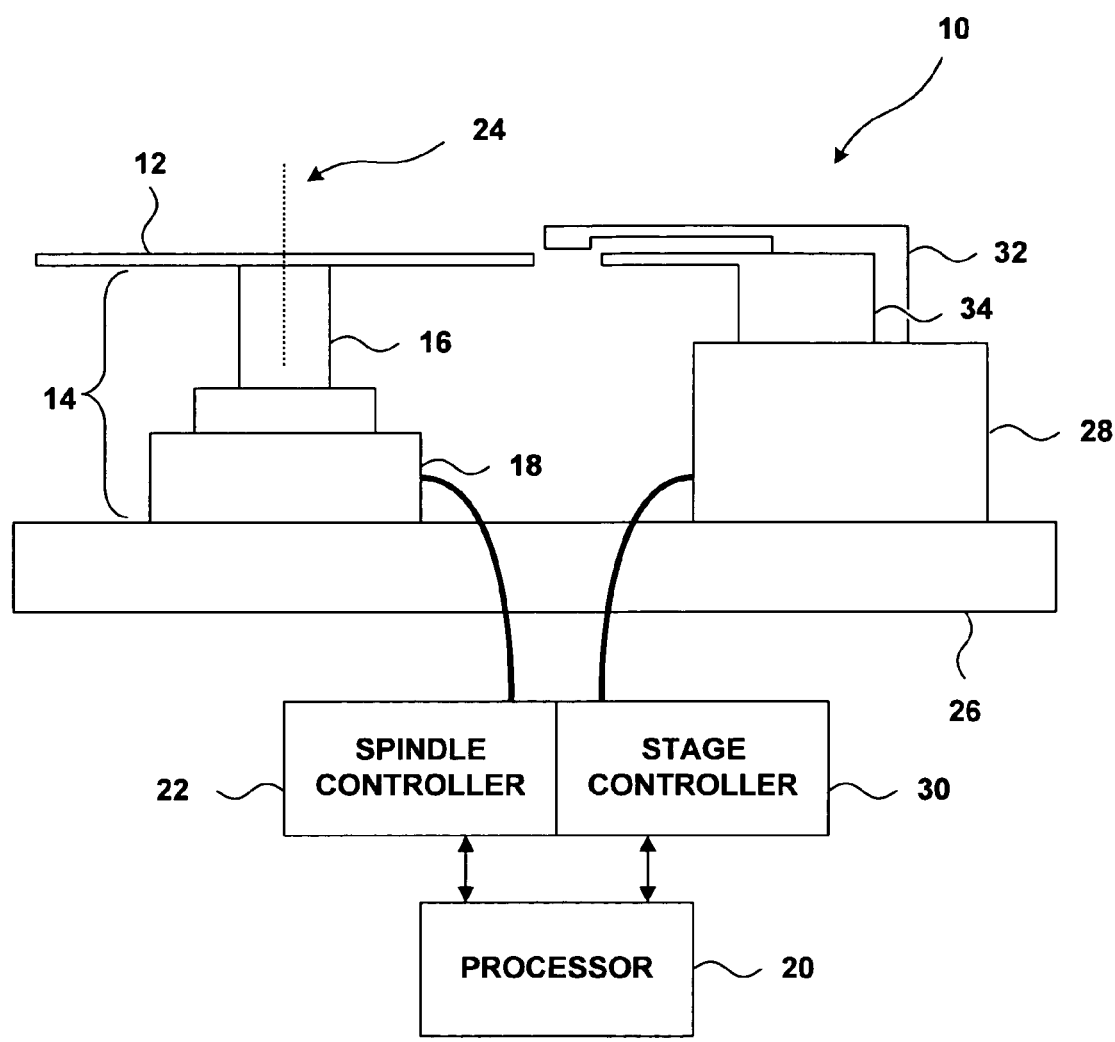
FIG. 1 is a conceptual system diagram showing a side view of an exemplary system that can practice the techniques of the invention.

FIG. 1 is a conceptual diagram showing a side view of an exemplary system 10 that can practice the techniques of the invention. A data storage disc 12, which can be any disc-shaped data storage medium such as a magnetic or optical medium, is mounted on a spindle assembly 14 that spins disc 12. Spindle assembly 14 includes a spindle adapter 16 and a spindle motor 18.

Spindle adapter 16 secures disc 12 to spindle assembly 14. Securing disc 12 generally means that disc 12 is held in place with respect to spindle assembly 14, and that disc 12 resists minor disturbances that could cause disc 12 to change position with respect to spindle assembly 14. The invention supports any structure or technique for securing disc 12 to spindle assembly 14, but it is desirable for spindle adapter 16 to be configured to secure and release disc 12 in response to a control signal from a control element such as processor 20. In one embodiment of the invention, spindle adapter 16 includes a vacuum clamp that is configured to secure disc 12 by engaging a vacuum and release disc 12 by disengaging the vacuum.

Spindle motor 18 spins spindle adapter 16, to which disc 12 is secured. A spindle controller 22 controls spindle motor 18 to regulate the angular velocity and angular position of disc 12, under the direction of processor 20. Spindle adapter 16 rotates around an axis 24. When the central point of the data on disc 12 is misaligned with axis 24, data on disc 12 rotates eccentrically. For reasons discussed below, it is generally desirable to reduce this eccentricity.

Spindle motor 18 is mounted to a deck 26. As depicted in FIG. 1, spindle motor 18 drives disc 12 to move in a rotational fashion with respect to deck 26, but spindle motor 18 does not drive disc 12 to move in a translational fashion with respect to deck 26. Spindle motor 18 is fixedly mounted to a deck 26 such that no part of spindle assembly 14 moves in a translational fashion with respect to deck 26.

A positioner assembly 28 is mounted to deck 26. Unlike spindle assembly 14, positioner assembly 28 is configured to move in a translational fashion with respect to deck 26. In particular, positioner assembly 28 is configured to move toward spindle assembly 14 and retract away from spindle assembly 14. In the embodiment of FIG. 1, positioner assembly 28 is also configured to move laterally, neither approaching nor retracting away from spindle assembly 14. A stage controller 30, which operates under the direction of processor 20, regulates the position of positioner assembly 28 with respect to deck 26. As described below, positioner assembly 28 is configured to sense the position of positioner assembly 28 and to enable fine position control of positioner assembly 28. Stage controller 30 can move a typical positioner assembly 28 to within one micrometer, or less, of any desired position.

In the exemplary embodiment of system 10 depicted in FIG. 1, system 10 is a testing apparatus for reading or writing elements for data storage devices, and can be used to ascertain whether a reading or writing element performs up to standards of quality. For purposes of illustration, system 10 tests HGAs that are configured to read from or write to electromagnetic discs. HGAs are mounted on a test arm 32, and positioner assembly 28 moves test arm 32 in proximity to disc 12 to test each HGA. In this embodiment of system 10, disc 12 is a test disc, and the HGAs read from or write to this test disc as part of quality control testing.

During such quality control testing, it is desirable that eccentricity with respect to axis 24 be very small. In other words, it is desirable for the central point to be closely aligned with spindle axis 24.

System 10 includes components that automatically detect eccentricity and adjust for the eccentricity by repositioning disc 12. A disc positioner 34, mounted on positioner assembly 28, is configured to physically move disc 12 relative to spindle assembly 14 such that the central point is closely aligned with spindle axis 24.

In the embodiment discussed below, disc positioner 34 is an element that is a pusher configured to push against an edge of disc 12. Although the invention encompasses disc positioners that pull, lift or otherwise affect the position of disc 12 relative to spindle assembly 14, a pusher is readily controllable. Furthermore, a pusher can have a simple construction and need not include any moving parts. As described below, positioner assembly 28 moves under the control of processor 20 and stage controller 30, but disc positioner 34 remains fixed with respect to positioner assembly 28 when disc 12 is being repositioned.

Figure 2:
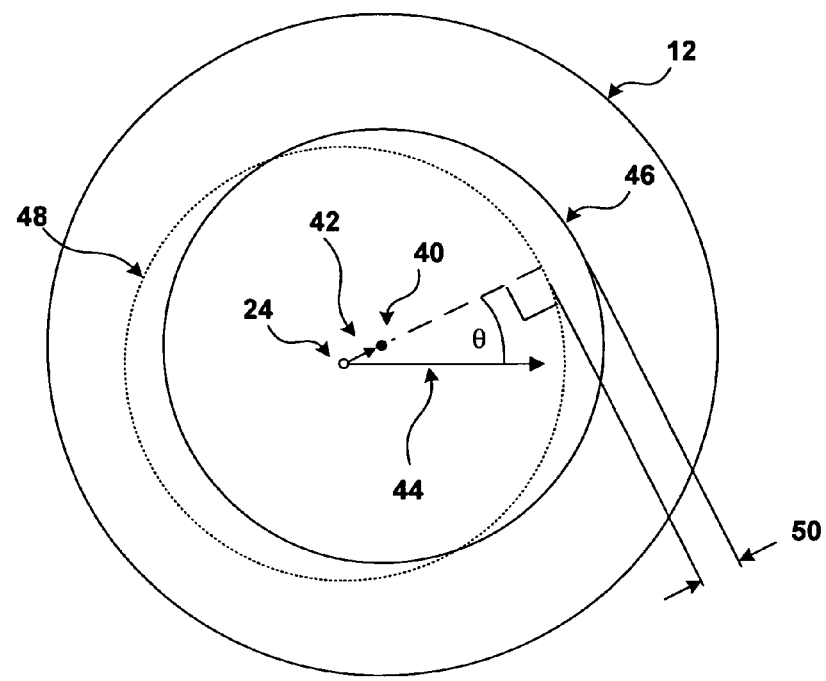
FIG. 2 is a conceptual overhead diagram illustrating eccentricity of a data track.

FIG. 2 is a conceptual overhead diagram that illustrates eccentricity of data tracks with respect to spindle axis 24. Test disc 12 is mounted on a spindle assembly (not shown in FIG. 2). Spindle axis 24 is represented by an open circle. Central point 40 is represented by a dark circle. The location of central point 40 is a function of the location of the data or the tracks on disc 12, and is not necessarily coincident with the geometric center of disc 12. As shown in FIG. 2, central point 40 is not aligned with spindle axis 24.

The magnitude and direction of misalignment between central point 40 and spindle axis 24 is represented by an eccentricity vector 42. The magnitude eccentricity vector 42 indicates the extent of misalignment, and the direction of eccentricity vector 42 indicates the direction in which the misalignment is most severe, with respect to a reference direction vector 44. For purposes of illustration, reference direction vector 44 points toward disc positioner 34.

Reference numeral 46 identifies a representative data track on disc 12, centered around central point 40. Because of the misalignment represented by eccentricity vector 42, data track 46 is not a substantially uniform distance from spindle axis 24. Reference numeral 48 identifies the ideal position for data track 46, at substantially a uniform distance from spindle axis 24. Reference numeral 50 identifies the maximum deviation of representative data track 46 from ideal position 48. The magnitude of deviation 50 is equal to the magnitude of eccentricity vector 42.

Eccentricity vector 42 is the same for every track on disc 12, whether the track is located near the geometric center of disc 12 or near the periphery. Ideally, eccentricity vector 42 should be exactly zero, with spindle axis 24 passing through central point 40. When axis 24 passes through central point 40, every track on disc 12 rotates around spindle axis 24 with no eccentricity.

In practice, it is not likely that eccentricity vector 42 can be precisely zero. In many applications of the invention, some eccentricity will be present. The invention supports reducing the eccentricity to a degree that the eccentricity is trivial. Thus, when it is said that eccentricity vector 42 is zero, what is meant is that eccentricity vector 42 is small enough to be of no significant consequence.

The magnitude and direction of eccentricity vector 42 can be determined in a number of ways. One technique involves using an HGA, such as an HGA mounted on a test arm 32, to follow one or more servo tracks or servo patterns on disc 12. Servo tracks and servo patterns are information written on disc 12 that serve as references or landmarks. In a disc drive, a servo control positioning system typically is provided to control the positioning of the HGA relative to the data tracks, using servo tracks or servo patterns as points of reference. By observing an HGA that follows, or that attempts to follow, one or more servo tracks or servo patterns, processor 20 can determine the magnitude of eccentricity vector 42.

In the embodiment of FIG. 1, spindle controller 22, stage controller 30 and processor 20 cooperate to determine the magnitude of eccentricity vector 42. Stage controller 30 and processor 20, receiving signals from an HGA, observe a servo track or servo pattern while disc rotates. Spindle controller 22 monitors the position of disc 12 when maximum deviation 50 occurs.

Figure 3:
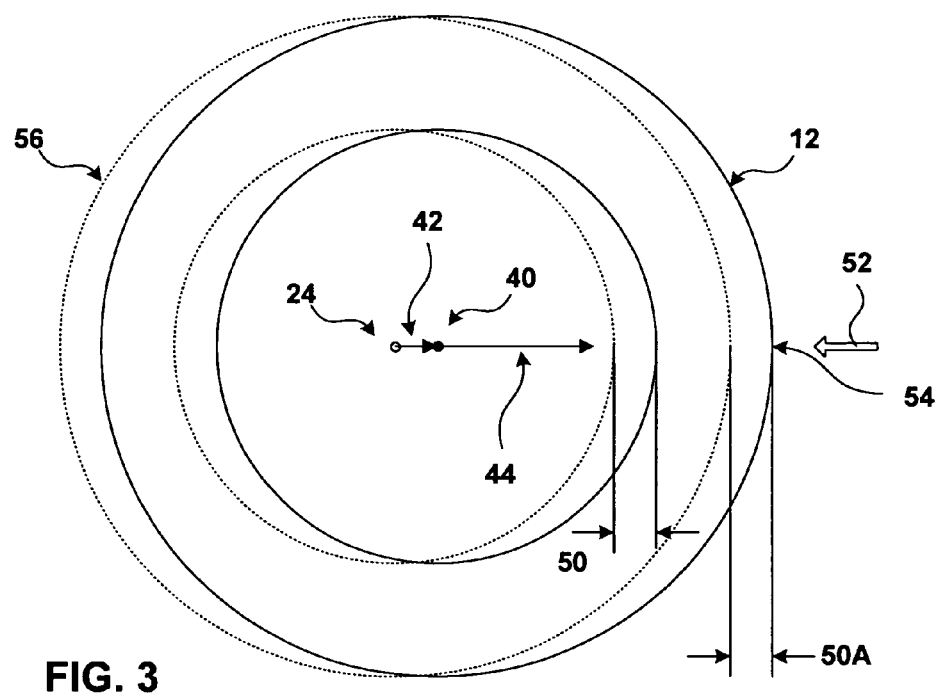
FIG. 3 is a conceptual overhead diagram that illustrating a technique for making a positional adjustment of a disc.

FIG. 3 is a conceptual overhead diagram that illustrates test disc 12 being made ready for a positional adjustment. In particular, processor 20 controls spindle controller 22 to rotate disc 12 so that eccentricity vector 42 is aligned with reference direction vector 44. As discussed previously, reference direction vector 44 points toward disc positioner 34. In an embodiment discussed below, reference direction vector 44 points toward a pusher that will displace disc 12 by pushing an edge of disc 12, and processor 20 controls spindle controller 22 to rotate disc 12 so as to align the greatest deviation toward the pusher. Reference numeral 52 identifies the direction in which disc positioner 34 will displace disc 12, thereby repositioning disc 12 on spindle assembly 14. When disc positioner 34 displaces disc 12 in direction 52 by maximum deviation 50, eccentricity vector 42 will be zero.

In one embodiment of the invention, disc positioner 34 displaces disc 12 simply by pushing disc 12 horizontally in direction 52. In particular, disc positioner 34 pushes edge 54 of disc 12 by a distance 50A, which is the same as maximum deviation 50. By pushing edge 54 of disc 12 in direction 52 by distance 50A, disc positioner 34 drives central point 40 closer to spindle axis 24. In this way, the eccentricity is reduced, and eccentricity vector 42 can be driven to zero. Disc positioner 34 also repositions disc 12 in a new location represented by dashed circle 56.

By observation of servo tracks or servo patterns, processor 20 has determined how far to push edge 54. Processor 20 initially lacks information about the location of edge 54, however. After processor 20 determines the location of edge 54, disc positioner 34 can push edge 54 by distance 50A, thereby driving eccentricity vector 42 to zero.

Figure 4:
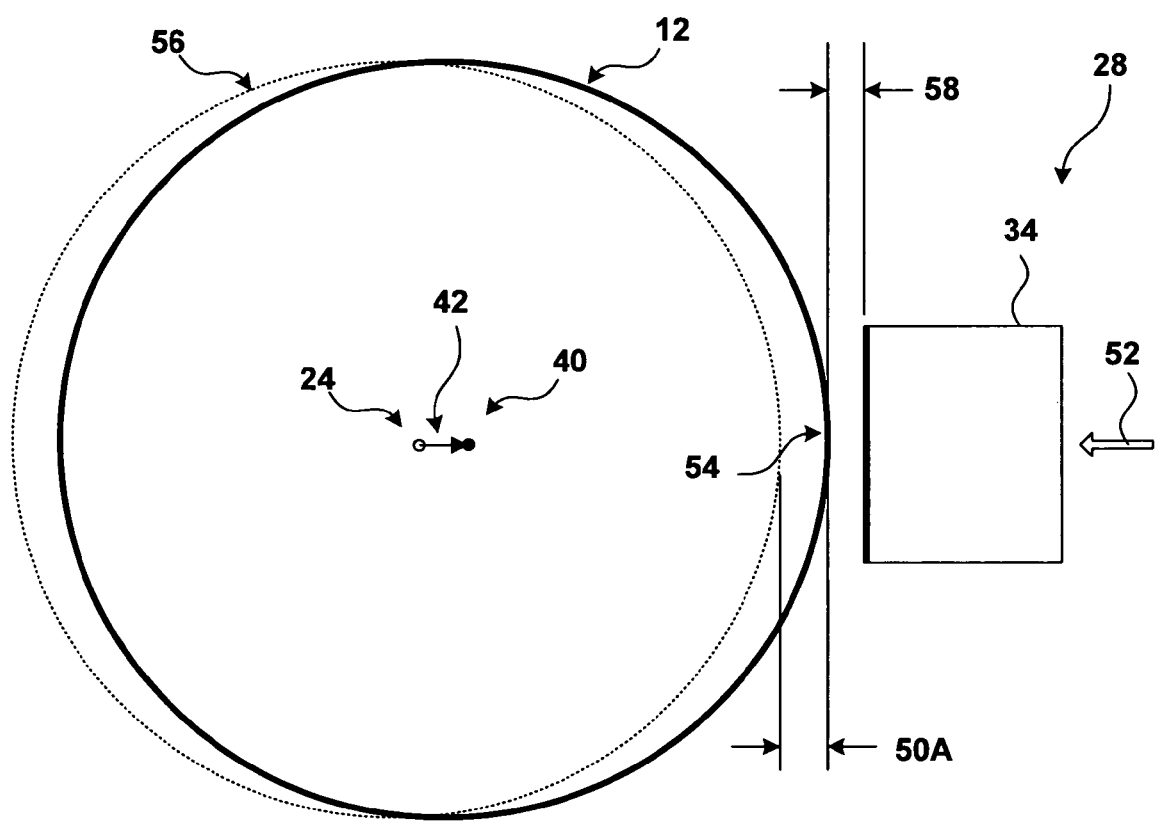
FIG. 4 is a conceptual overhead diagram illustrating a technique for automatically determining the location of an edge of a disc.

FIG. 4 is a conceptual overhead diagram that illustrates a technique for automatically determining the location of edge 54 of test disc 12. In FIG. 4, disc positioner 34 is embodied as a pusher mounted on positioner assembly 28. Stage controller 30, under the direction of processor 20, moves positioner assembly 28 and pusher 34 in direction 52. At some point, pusher 34 encounters edge 54 of test disc 12, and pusher 34 pushes against edge 54. In FIG. 4, however, test disc 12 is secured on spindle adapter 16. As a result, pusher 34 encounters resistance to its movement when pusher 34 meets edge 54 and tries to push test disc 12.

Stage controller 30 and processor 20 can detect where the resistance begins. In a representative embodiment, resistance can be detected using a force sensor, velocity sensor or position sensor that measure the actual acceleration, velocity, or position of pusher 34 relative to the commanded acceleration, velocity, or position. The resistance manifests itself as a "following error." In the case of position monitoring, for example, a following error may be a difference between where pusher 34 actually is and where pusher 34 is supposed to be. The following error can be detected via stage controller 30, which moves positioner assembly 28 and which simultaneously senses the actual position of positioner assembly 28. Processor 20 continuously observes the following error as pusher 34 moves toward test disc 12. When the following error surpasses a preselected threshold, processor 20 determines that the following error is due to the fact that pusher 34 has encountered edge 54 of test disc 12. The position of pusher 34 at the point when the following error surpasses the preselected threshold is the position of edge 54. In this way, processor 20 determines the location of edge 54.

After processor 20 has determined the location of edge 54, processor 20 directs stage controller 30 to withdraw pusher 34, so that pusher 34 will not be applying pressure against test disc 12. The location of edge 54 is known because of the procedure described above. Further, the position of pusher 34 in its withdrawn position is also known. Therefore, the distance 58 from pusher to edge is known. Processor 20 releases test disc 12 from its secured condition on spindle adapter 16 so that test disc is no longer secured and is free to be pushed by pusher 34. Processor 20 then directs stage controller 30 to move pusher 34 in direction 52. Processor 20 directs stage controller 30 to move pusher 34 by a distance 58, at which point pusher 34 encounters edge 54. Pusher 34 pushes edge 54 by distance 50A, which aligns central point 40 with spindle axis 24. Processor 20 directs stage controller 30 to withdraw pusher 34, and re-secures test disc 12 to spindle adapter 16. In this way, pusher 34 displaces disc 12 in direction 52 by maximum deviation 50A, driving eccentricity vector 42 to zero.

Figure 5:
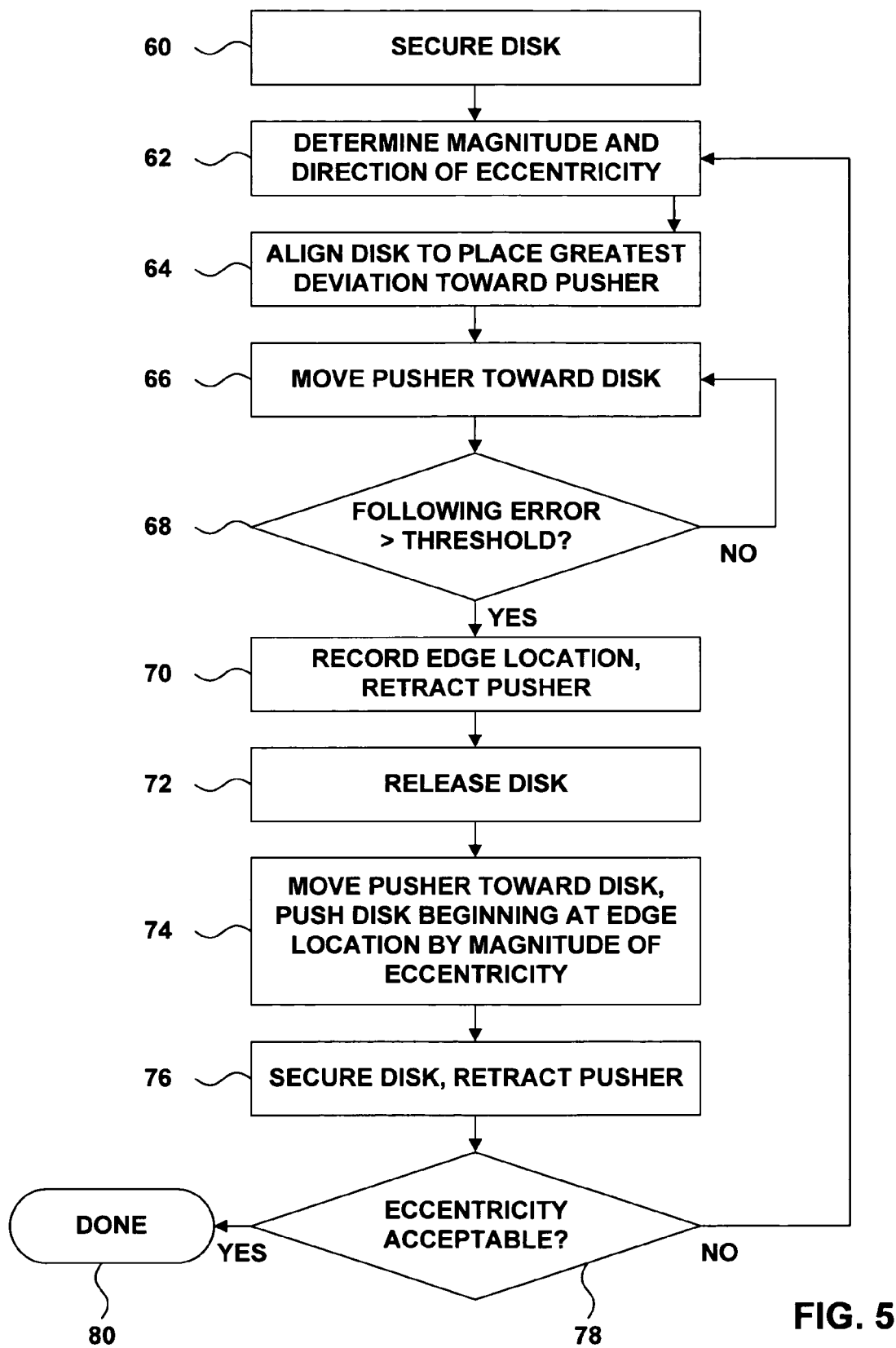
FIG. 5 is a flow diagram illustrating exemplary procedures according to an embodiment of the invention.

FIG. 5 illustrates the procedure described above. Processor 20 controls spindle adapter 16 to secure disc 12 to spindle adapter 16 (60). Thereafter processor 20 determines the magnitude and direction of eccentricity vector 42, which represents the misalignment of central point 40, around which data on disc 12 are arranged, with spindle axis 24 (62). Processor 20 can determine the magnitude and direction of the eccentricity by observing servo tracks or servo patterns, as described above. Processor 20 controls spindle controller 22 to position disc 12 for a positional adjustment by rotating disc 12 to align the greatest deviation toward pusher 34 (64). In other words, processor 20 controls spindle controller 22 to orient eccentricity vector 42 along direction 52 that pusher 34 will be pushing. As depicted in FIGS. 3 and 4, eccentricity vector 42 is oriented along the same line as direction 52. When disc 12 is pushed in direction 54, central point 40 will be driven closer to spindle axis 24, and eccentricity vector 42 will thereby become smaller.

Before actually pushing disc 12, processor 20 determines the location of edge 54 of disc 12. Processor 20 controls stage controller 30 to move pusher 34 toward disc 12 (66) and monitor the following error. When the following error surpasses a preselected threshold (68), the position of pusher 34 represents the location of edge 54. Processor 20 records the location of edge 54 and controls stage controller 30 to retract pusher 34 (70).

Processor 20 controls spindle adapter 16 to release disc 12 (72), allowing disc 12 to be repositioned. Processor 20 then directs stage controller 30 to move pusher 34 in direction 52. Processor 20 directs stage controller 30 to move pusher toward disc 12, and to push edge 54 by a distance equal to the magnitude of eccentricity vector 42 (74). In this way, pusher 34 drives eccentricity vector 42 to zero. Processor 20 once again controls spindle adapter 16 to secure disc 12 to spindle adapter 16 and controls stage controller 30 to retract pusher 34 (76).

The invention supports checking disc 12 in its new position to determine whether the eccentricity vector has been reduced by an acceptable amount (78). Once again, processor 20 can observe servo tracks or servo patterns, as described above, and when the eccentricity has been reduced to an acceptable degree, processor 20 can determine that positioning operations are complete (80). Otherwise, processor 20 can repeat the above procedure, making a further attempt to drive eccentricity vector 42 to zero.

The invention may result in one or more advantages. The invention supports automatic adjustment of the position of a test disc to reduce eccentricity of the tracks on the test disc. The apparatus used to adjust the position of a test disc need not be complex or use many moving parts. In one embodiment, the invention uses a pusher mounted on a positioner assembly to push an edge of the disc to align the central point with the spindle axis.

Although the invention may be applied to any data storage device that reads data to or writes data from a disc storage disc, the invention can be advantageous in the context of an apparatus that tests HGAs. During such testing, it can be desirable to control the factors that may influence performance of an HGA being tested. Rather than compensating for existing eccentricity, it may be desirable to reduce the eccentricity so that compensation is less important or unnecessary.

Various embodiments of the invention have been described. Various modifications may be made without departing from the scope of the claims. For example, the eccentricity vector can be defined as being directed toward spindle axis 24, rather than toward central point 40 as shown in FIGS. 2-4, and still indicate the magnitude and the direction of misalignment. Further, test arm 32 need not be mounted on positioner assembly 28 with disc positioner 34, but may be deployed on a separate structure.

Further, the invention supports embodiments in which orienting the eccentricity vector along the line in which the edge will be pushed can be accomplished by moving the pusher to the site of maximum deviation, rather than by rotating the disc so that the maximum deviation is proximate to the pusher.

Some of the techniques of the invention may be embodied as a computer-readable medium comprising instructions that cause a programmable processor, such as microprocessor 20 in FIG. 1, to carry out the techniques of the invention. The programmable processor may include one or more individual processors, which may act independently or in concert. A "computer-readable medium" includes but is not limited to read-only memory, Flash memory and a magnetic or optical storage medium. These and other embodiments are within the scope of the following claims.

The invention claimed is:

1. A method comprising:
   determining a magnitude and a direction of an eccentricity vector representing a misalignment of a central point around which data are arranged on a data storage disc with an axis of a spindle;
   determining the location of an edge of the disc; and
   pushing the edge of the disc with a processor-controlled positioner to drive the central point closer to the axis of the spindle.

2. The method of claim 1, wherein determining the location of the edge of the disc comprises:
   moving the positioner toward the edge of the disc;
   determining that the edge has been located when the positioner encounters resistance to the movement of the positioner.

3. The method of claim 2, further comprising:
   monitoring a difference between where the positioner is located and where the positioner is supposed to be; and
   determining that the edge has been located when the difference surpasses a threshold.

4. The method of claim 1, wherein determining a magnitude and a direction of an eccentricity vector comprises:
   observing a head that follows one or more servo tracks or servo patterns on the disc; and
   determining the magnitude and the direction of the eccentricity vector as a function of the observation.

5. The method of claim 1, further comprising:
   securing the disc to the spindle to a secured condition prior to determining the location of the edge;
   releasing the disc from the secured condition prior to pushing the edge; and
   re-securing the disc to the spindle to the secured condition after pushing the edge.

6. The method of claim 1, further comprising:
   after determining a magnitude and a direction of an eccentricity vector, rotating the disc to orient the eccentricity vector along a line in which the edge will be pushed.

7. The method of claim 1,
   wherein determining a magnitude and a direction of an eccentricity vector comprises:
      observing a head that follows one or more servo tracks or servo patterns on the disc, and
      determining the magnitude and the direction of the eccentricity vector as a function of the observation,
   wherein the method further comprises, after determining a magnitude and a direction of an eccentricity vector, rotating the disc to orient the eccentricity vector along a line in which the edge will be pushed.

8. A computer-readable medium comprising instructions for causing a programmable processor to:
   determine a magnitude and a direction of an eccentricity vector representing a misalignment of a central point around which data are arranged on a data storage disc with an axis of a spindle;
   determine the location of an edge of the disc; and
   control a positioner to push the edge of the disc to drive the central point closer to the axis of the spindle.

9. The medium of claim 8, the instructions further causing the processor to:
   control the positioner to move toward the edge of the disc;
   determine that the edge has been located when the positioner encounters resistance to the movement of the positioner.

10. The medium of claim 9, the instructions further causing the processor to:
monitor a difference between where the positioner is located and where the positioner is supposed to be; and
determine that the edge has been located when the difference surpasses a threshold.

11. The medium of claim 8, the instructions further causing the processor to:
observe a head that follows one or more servo tracks or servo patterns on the disc; and
determine the magnitude and the direction of the eccentricity vector as a function of the observation.

12. The medium of claim 8, the instructions further causing the processor to:
control an adapter to secure the disc to a secured condition on the spindle prior to determining the location of the edge;
control the adapter to release the disc from the secured condition prior to controlling the positioner to push the edge; and
control the adapter to re-secure the disc to the secured condition on the spindle after controlling the positioner to push the edge.

13. The medium of claim 8, the instructions further causing the processor to rotate the disc to orient the eccentricity vector along a line in which the edge will be pushed.

14. A system comprising:
a spindle assembly having an axis comprising a spindle adapter configured to secure a data storage disc to the spindle assembly, and
a positioner assembly configured to move the disc with respect to the spindle assembly; and
a processor configured to determine a magnitude and a direction of an eccentricity vector representing a misalignment of a central point around which data are arranged on the data storage disc, and to control the positioner assembly to drive the central point around which data are arranged on the disc closer to the axis.

15. The system of claim 14, further comprising:
a head configured to follow one or more servo tracks or servo patterns on the disc,
wherein the processor configured to observe the head and to determine the magnitude and the direction of an eccentricity vector as a function of the observation.

16. The system of claim 14, further comprising:
a detector configured to detect resistance to movement of the positioner assembly,
wherein the processor configured to determine a location of an edge of the disc as a function of the detection.

17. The system of claim 14, wherein the positioner assembly is configured to move toward the spindle assembly and retract away from the spindle assembly.

18. The system of claim 14, wherein the positioner assembly comprises a pusher configured to move the disc with respect to the spindle assembly by pushing an edge of the disc.

19. The system of claim 18, wherein the processor is further configured to determine a location of the edge of the disc.

20. The system of claim 19, wherein the processor is further configured to:
control moving the pusher toward the edge of the disc; and
determine that the edge has been located when the pusher encounters resistance to the movement of the pusher.

21. The system of claim 18, wherein the processor is further configured to control the pusher to push the edge of the disc with the pusher to drive the central point closer to the axis.

22. The system of claim 18, wherein the processor is further configured to rotate the disc to orient the eccentricity vector along a line in which the edge will be pushed.

23. The system of claim 14, the spindle assembly further comprising a spindle motor configured to rotate the disc around the axis.

24. The system of claim 23, wherein the processor is further configured to control the spindle motor.

25. The system of claim 14, further comprising a test arm configured to follow one or more servo tracks or servo patterns on the disc.

26. The system of claim 25, wherein the test arm is mounted to the positioner assembly.

* * * * *